United States Patent
Saito

(10) Patent No.: US 8,547,807 B2
(45) Date of Patent: Oct. 1, 2013

(54) INFORMATION PROCESSING APPARATUS AND MEDIUM PROCESSING APPARATUS

(75) Inventor: Yoshinao Saito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/562,892

(22) Filed: Jul. 31, 2012

(65) Prior Publication Data

US 2013/0081068 A1    Mar. 28, 2013

(30) Foreign Application Priority Data

Sep. 22, 2011    (JP) .................................. 2011-207248

(51) Int. Cl.
*G11B 19/28* (2006.01)
*G06F 1/32* (2006.01)

(52) U.S. Cl.
USPC ...................... 369/30.36; 369/13.21; 713/320

(58) Field of Classification Search
USPC ................... 369/30.36, 13.21; 713/320, 300, 713/324, 330, 340, 115

See application file for complete search history.

(56) References Cited

U.S. PATENT DOCUMENTS

| 7,620,831 B2 * | 11/2009 | Takahashi ..................... 713/324 |
| 2005/0094503 A1 * | 5/2005 | Higashi ..................... 369/30.36 |

FOREIGN PATENT DOCUMENTS

| JP | 9-34365 |   | 2/1997 |   |
| JP | 11-073720 | * | 3/1999 | ................ 369/13.21 |
| JP | 11-149689 | * | 6/1999 | ................ 369/13.21 |
| JP | 2000-322808 |   | 11/2000 |   |

\* cited by examiner

*Primary Examiner* — Nabil Hindi
(74) *Attorney, Agent, or Firm* — Fujitsu Patent Center

(57) ABSTRACT

A medium processing apparatus that performs predetermined processing on a medium introduced from an outside; a power supply that can supply a first power supply voltage to the medium processing apparatus while the information processing apparatus is operating, whereas being able to supply a second power supply voltage to the medium processing apparatus when the information processing apparatus is shut down; and a power supply controller that supplies the second power supply voltage from the power supply to the medium processing apparatus when the information processing apparatus is shut down while the medium is in the medium processing apparatus, whereas stopping the supply of the second power supply voltage to the medium processing apparatus once the medium is removed from the medium processing apparatus which has been supplied with the second power supply voltage, are provided.

16 Claims, 13 Drawing Sheets

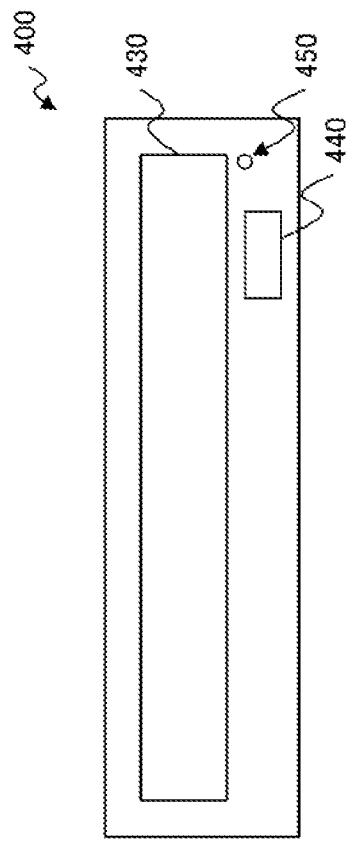

INFORMATION PROCESSING APPARATUS AND MEDIUM PROCESSING APPARATUS

CROSS-REFERENCE TO RELATED APPLICATION

This application is based upon and claims the benefit of priority of the prior Japanese Patent Application No. 2011-207248, filed on Sep. 22, 2011, the entire contents of which are incorporated herein by reference.

FIELD

The present disclosure relates to an information processing apparatus including a medium processing apparatus that performs predetermined processing on a medium introduced from outside, and such a medium processing apparatus.

BACKGROUND

FIG. 13 is a diagram illustrating an example of a structure for loading and unloading an optical disk (medium) in an optical disk apparatus (medium processing apparatus) 400 provided in a personal computer (hereinafter, referred to as a PC).

As illustrated in FIG. 13, the optical disk apparatus 400 includes a medium tray 430 that receives a medium (e.g., a CD-ROM), an eject button 440 used for opening or closing medium tray 430, and a forced eject hole 450 used for forcefully open the medium tray 430. In this PC, when a user presses the eject button 440, the medium tray 430 is opened, the user places a medium on the opened medium tray 430 and presses the eject button 440 again. In response, the medium tray 430 is closed to load the medium placed on the medium tray 430 to the optical disk apparatus 400. The PC then processes the medium loaded to the optical disk apparatus 400, such as reading recorded data, videos, and audios from the medium.

In the PC having an internal optical disk apparatus 400, when the PC is powered off, i.e., when the operating system (OS) is shut down and supply of power from a power supply unit provided within the PC is stopped, no power is supplied any more to the optical disk apparatus 400. Specifically, when the PC is powered off, no power is supplied to a motor (not illustrated) that opens and closes the medium tray 430 in the optical disk apparatus 400. Therefore, the medium tray 430 never opens when the user presses the eject button 440.

Typically, in order to check whether or not a medium is left, i.e., whether or not a medium is in the optical disk apparatus 400, after a PC is powered off, a user or any other person, such as a third party, of the PC (hereinafter, simply referred to as the "user") employs the following technique (i) or (ii), for example.

(i) The user powers on the PC again, and after the PC (OS) is started up, the user presses the eject button 440 to open the medium tray 430 to check for a medium.

(ii) The user inserts an elongated pin into the forced eject hole 450 for forcefully opening the medium tray 430 to check for a medium.

As related art, there are techniques where a user is notified that a medium is in a drive, if the media is detected upon a power-off of the computer by software, thereby preventing the medium from being left in the drive.

Patent Reference 1: Japanese Laid-open Patent Publication No. 2000-322808
Patent Reference 2: Japanese Laid-Open Patent Application No. H09-34365

In the above technique (i), the user has to wait until the PC is started up before opening the medium tray 430 to check for a medium, and the thereafter user has to power down the PC again, which is somewhat burdensome.

In the above technique (ii), the user has to find a pin to be inserted to the forced eject hole 450, and finding such a pin requires some time and efforts.

Further, the technique (ii) is unavailable if no pin is found or the optical disk apparatus 400 has no forced eject hole 450. In such a case, the technique (i) is the solo option.

The techniques (i) and (ii) may become particularly very time-consuming and burdensome if a user is looking for a missing medium which is left in an optical disk apparatus 400 in one of a lot of (e.g., dozens or more) PCs in a computer room in school or any other facility.

The above-described technique where software notifies a user that a medium is left when the media is detected, is available only when the PC is operating, i.e., the PC is powered on. Hence, once the PC is powered off, no notification is made.

In addition to optical disk apparatuses 400 provided in PCs, similar issues arise for optical disk apparatuses 400 provided in a wide variety of other apparatuses (information processing apparatuses), such as audio and visual (AV) appliances and car navigation systems.

SUMMARY

A disclosed information processing apparatus includes a medium processing apparatus that performs predetermined processing on a medium introduced from an outside; a power supply that can supply a first power supply voltage to the medium processing apparatus while the information processing apparatus is operating, whereas being able to supply a second power supply voltage to the medium processing apparatus when the information processing apparatus is shut down; and a power supply controller that supplies the second power supply voltage from the power supply to the medium processing apparatus when the information processing apparatus is shut down while the medium is in the medium processing apparatus, whereas stopping the supply of the second power supply voltage to the medium processing apparatus once the medium is removed from the medium processing apparatus which has been supplied with the second power supply voltage.

Further, a disclosed medium processing apparatus performs predetermined processing on a medium introduced from an outside, the medium processing apparatus including: a power supply controller, wherein the medium processing apparatus is provided in an information processing apparatus including a power supply that can supply a first power supply voltage to the medium processing apparatus while the information processing apparatus is operating, whereas being able to supply a second power supply voltage to the medium processing apparatus when the information processing apparatus is shut down, and the power supply controller supplies the second power supply voltage from the power supply to an inside of the medium processing apparatus when the information processing apparatus is shut down while the medium is in the medium processing apparatus, whereas stopping the supply of the second power supply voltage to the inside of the medium processing apparatus once the medium is removed from the medium processing apparatus which has been supplied with the second power supply voltage.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 13 is a diagram illustrating an example of a structure for loading and unloading an optical disk in an optical disk apparatus provided in a PC.

DESCRIPTION OF EMBODIMENTS

Hereinafter, embodiments of the present disclosure will be described with reference to the drawings.

(1) First Embodiment (1-1) Configuration of First Embodiment

Figure 1:
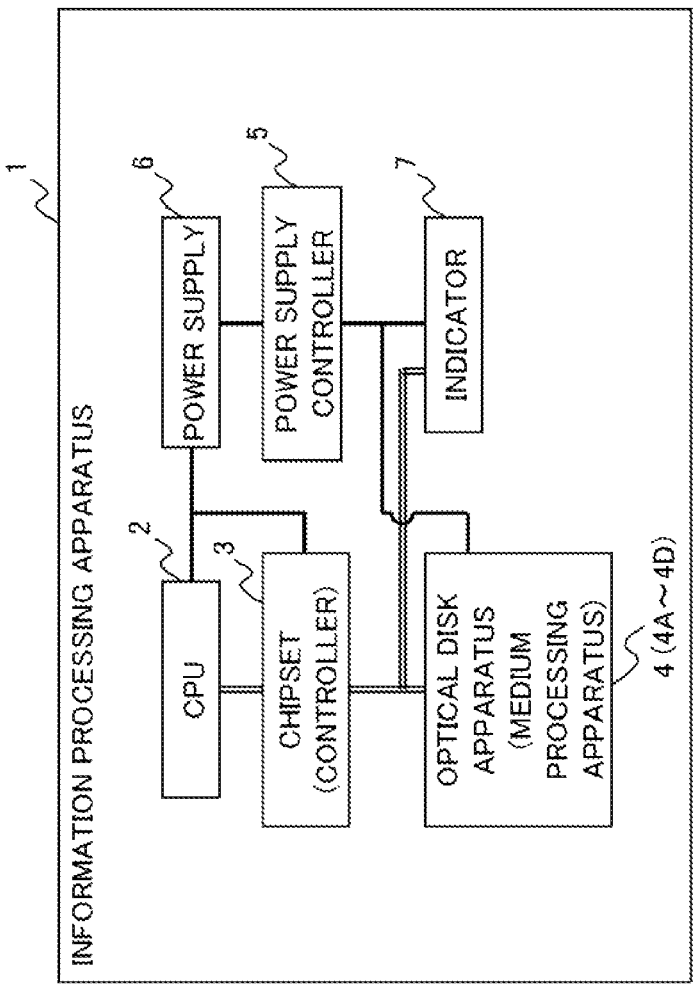
FIG. 1 is a diagram illustrating an exemplary configuration of an information processing apparatus as first and second embodiments.
Figure 2:
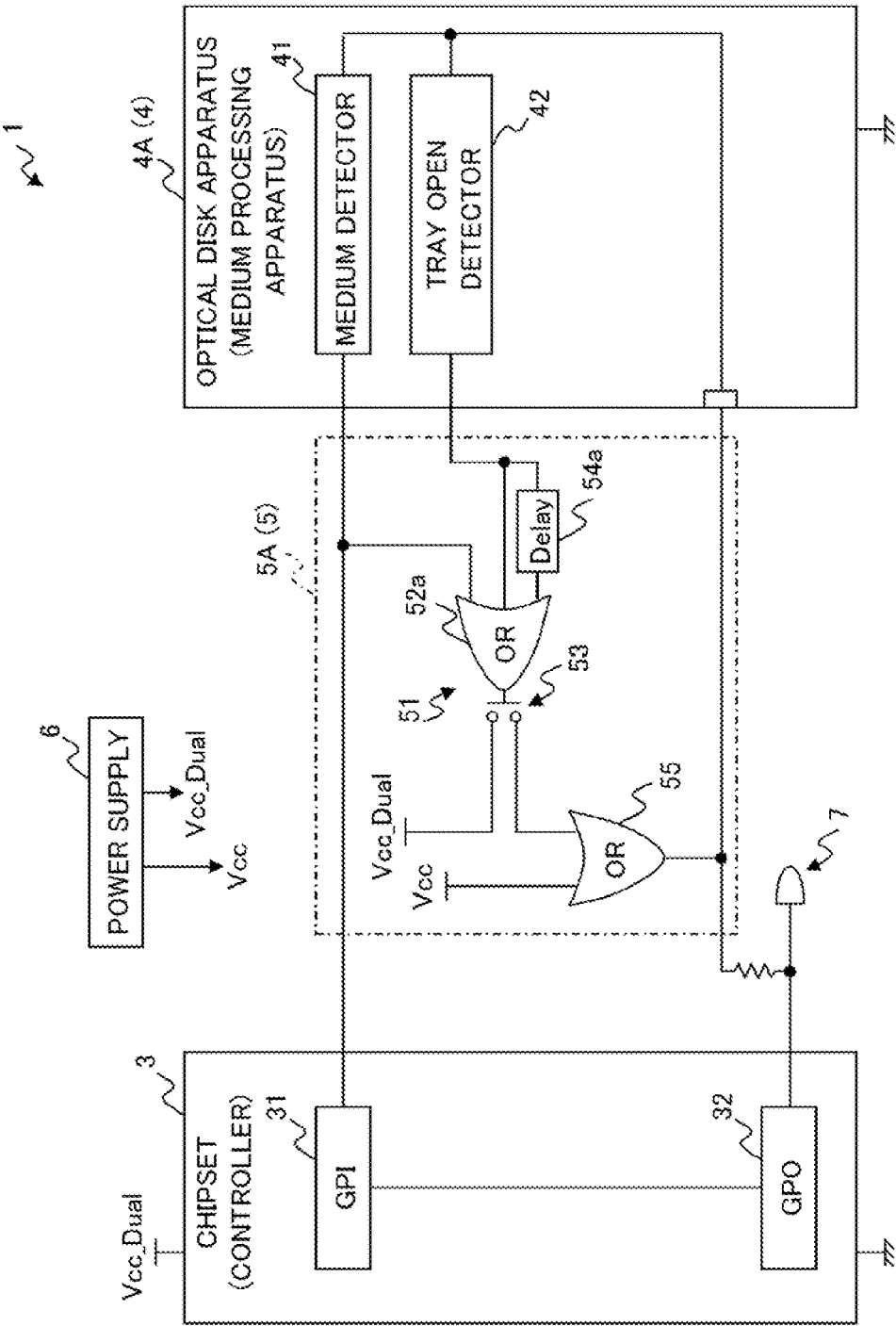
FIG. 2 is a block diagram illustrating a detailed exemplary configuration of the information processing apparatus according to the first embodiment.
Figure 3:
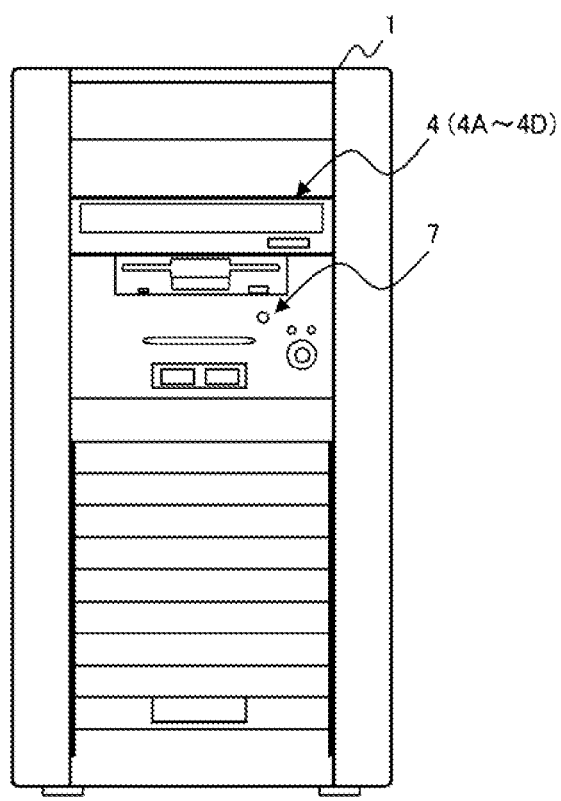
FIG. 3 is a frontal view illustrating an example of the information processing apparatus according to the first embodiment.
Figure 4:
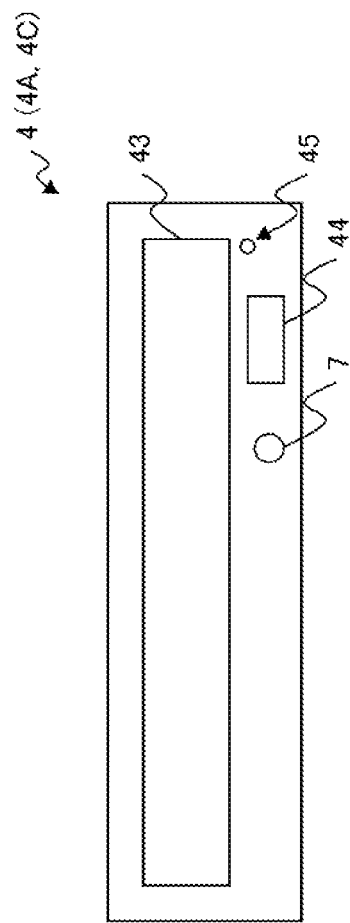
FIG. 4 is a diagram illustrating an exemplary structure for loading and unloading an optical disk in an optical disk apparatus according to the first embodiment.

FIG. 1 is a diagram illustrating an exemplary configuration of an information processing apparatus 1 as a first embodiment, and FIG. 2 is a block diagram illustrating a detailed exemplary configuration of the information processing apparatus 1. FIG. 3 is a frontal view illustrating an example of the information processing apparatus 1, and FIG. 4 is a diagram illustrating an exemplary structure for loading and unloading an optical disk in an optical disk apparatus 4.

The information processing apparatus 1 is an apparatus of various types which can include an internal optical disk apparatus 4, and examples of such an information processing apparatus 1 includes PCs, a wide variety of AV appliances (e.g., a CD player and a DVD player) and a car navigation system.

As illustrated in FIG. 1, the information processing apparatus 1 includes a central processing unit (CPU) 2, a chipset 3, an optical disk apparatus 4, a power supply controller 5, a power supply unit 6, and an indicator 7.

In FIG. 1, the double lines indicate buses (e.g., control buses and data buses), while the single lines indicate power lines for supplying power supply voltages Vcc and Vcc_standby to the components from the power supply unit 6 (described later).

The CPU 2 is a processing apparatus (processor) that performs various controls and computations, and embodies functions by temporarily storing and saving programs stored in the optical disk apparatus 4, an Input/output (IO) apparatus, such as a hard disk drive (HDD), a read only memory (ROM), or the like, to a random access memory (RAM, not illustrated), and executing the programs from the RAM. In place of the CPU 2, any other processors, e.g., a micro processing unit (MPU), may be provided.

The power supply unit 6 supplies the power supply voltage Vcc or Vcc_standby to the components (e.g., the CPU 2, the chipset 3, the optical disk apparatus 4, the power supply controller 5, and the indicator 7) in the information processing apparatus 1, using a power supplied from an power source external to the information processing apparatus 1, and functions as a Vcc or Vcc_Dual power supply for those components.

Here, the Vcc power supply in the power supply unit 6 is a power supply that supplies a power supply voltage Vcc (first power supply voltage) to the components, when the information processing apparatus 1 is powered on (the information processing apparatus 1 is being operated), i.e., when the OS and firmware, etc. are operated and executed by the CPU 2 on the information processing apparatus 1. In other words, the Vcc power supply supplies the power supply voltage Vcc to the components, once the information processing apparatus 1 is started. That is, the Vcc power supply supplies the power supply voltage Vcc used for executing the OS and firmware, etc. by CPU 2 on the information processing apparatus 1. The Vcc power supply stops the supply of the power supply voltage Vcc when the information processing apparatus 1 is powered off (the information processing apparatus 1 is shut down), i.e., when the OS or firmware, etc. is shut down by the CPU 2 on the information processing apparatus 1.

Like the power supply voltage Vcc, the Vcc_Dual power supplies the power supply voltage Vcc to the components inside the information processing apparatus 1, including at least the optical disk apparatus 4 (the power supply controller 5), when the information processing apparatus 1 is powered on. Once the information processing apparatus 1 is powered off, however, the Vcc_Dual power supplies a power supply voltage Vcc_standby (second power supply voltage) to the components inside the information processing apparatus 1, including at least the optical disk apparatus 4 (the power supply controller 5). That is, when the OS or firmware, etc. executed by the CPU 2 on the information processing apparatus 1 is shut down, the power supply unit 6 as the Vcc_Dual power supply assumes that the information processing apparatus 1 is powered off (is being shut down), and stops the supply of the power supply voltage Vcc inside the information processing apparatus 1 and supplies the power supply voltage Vcc_standby instead.

As used herein, the state of "shut down" includes, other than the state where power supply to the CPU 2, a memory, and an HDD, etc. is stopped in response to a termination of the OS or firmware, etc., a resume wherein power supply to the CPU 2, the memory, and the HDD, etc. is stopped after stored the programs (e.g., the OS), saved in and operated from a memory, to the HDD; or a standby (sleep) where the power is continued to be supplied to the memory where the programs (e.g., the OS) are saved, while the power supply to the CPU 2, an HDD, and the like is stopped.

The optical disk apparatus (medium processing apparatus) 4 is an apparatus that performs predetermined processing on an optical disk (medium) introduced from outside, under the control of the CPU 2 via the chipset 3 (described later). The optical disk apparatus 4 reads data from an optical disk in response to a data read request from the CPU 2, or writes data to the optical disk in response to a data write request from the CPU 2, for example.

As used herein, the term "optical disk" refers to any recording media that can be read by the medium processing apparatus, including CDs (e.g., a CD-ROM, CD-R, and CD-RW, etc), DVDs (e.g., a DVD-ROM, DVD-RAM, DVD-R, DVD+R, DVD-RW, DVD+RW, HD DVD, etc), BDs (e.g., a BD-ROM, BD-R, BD-RE, etc), a laser disk.

Although an optical disk is described as an example of a medium processed by the optical disk apparatus 4 according to the first embodiment and a second embodiment (described later), this is not limiting.

The medium processed by the medium processing apparatus 4 may be tapes, e.g., video home system (VHS) tapes, which can be loaded and/or unloaded under electrical and mechanical controls by the medium processing apparatus 4, and in such a case, the medium processing apparatus 4 may be a video tape recorder. Alternatively, cartridge media, such as flexible disks, magnetic disks, magneto-optical disks, may be used as a medium processed by the medium processing apparatus 4, as long as the media can be loaded and/or unloaded under electrical and mechanical controls by the medium processing apparatus 4.

As illustrated in FIGS. 2 and 4, the optical disk apparatus 4A according to the first embodiment includes a medium detector 41, a tray open detector 42, a medium tray 43, an eject button 44, and a forced eject hole 45 used for forcefully opening the medium tray 43. Hereinafter, the optical disk apparatus 4A and optical disk apparatuses 4B to 4D (described later) are simply referred to as an "optical disk apparatus 4" when no distinction among them is made.

The medium detector 41 detects whether an optical disk is in the optical disk apparatus 4, and outputs a medium detection signal using the power supply voltage Vcc or Vcc_standby if an optical disk is loaded in the optical disk apparatus 4 (the medium tray 43).

Specifically, the medium detector 41 operates on the power supply voltage Vcc or Vcc_standby supplied to the optical disk apparatus 4 from the power supply controller 5 (described later), and outputs the medium detection signal to the power supply controller 5 and the chipset 3 while it detects an optical disk inside the optical disk apparatus 4.

Note that the medium detector 41 may be embodied using an optical pickup in the optical disk apparatus 4 or a sensor or the like which can detect an absence or presence of an optical disk inside the optical disk apparatus 4 (the medium tray 43).

The medium tray 43 is a tray that is opened or closed for unloading or loading an optical disk from or to the optical disk apparatus 4A, and is opened or closed in response to an operation of the eject button 44 by a user.

Hereinafter, the term "user" refers to the person who uses the information processing apparatus 1 and any other third parties who check whether or not a medium is left, i.e., whether or not a medium is in the optical disk apparatus 4.

The tray open detector 42 outputs a tray open signal using the power supply voltage Vcc or Vcc_standby while the medium tray 43 is opened.

Specifically, while the medium tray 43 is opened, the tray open detector 42 operates on the power supply voltage Vcc or Vcc_standby supplied to the optical disk apparatus 4A from the power supply controller 5A (described later), and outputs the tray open signal to the power supply controller 5A.

Note that the tray open detector 42 may be embodied using a limit switch or the like, or a sensor or the like which can detect an open and close of the medium tray 43.

The power supply controller 5 controls to supply the power supply voltage Vcc or Vcc_standby from the power supply unit 6 to the optical disk apparatus 4 and the indicator 7.

Specifically, the power supply controller 5 controls to supply the power supply voltage Vcc from the power supply unit 6 to the optical disk apparatus 4 when the information processing apparatus 1 is powered on. On the other hand, the power supply controller 5 controls to supply the power supply voltage Vcc_standby to the optical disk apparatus 4 and the indicator 7 after the information processing apparatus 1 is powered off while the optical disk is in the optical disk apparatus 4.

Additionally, the power supply controller 5 stops the supply of the power supply voltage Vcc_standby to the optical disk apparatus 4 and the indicator 7 once an optical disk is removed from the optical disk apparatus 4 which has been supplied with the power supply voltage Vcc_standby.

As illustrated in FIG. 2, the power supply controller 5A according to the first embodiment includes a switch 51, a delay unit 54a, and an OR circuit 55. Hereinafter, the power supply controller 5A and a power supply controller 5B (described later) are simply referred to as a "power supply controller 5" when no distinction among them is made. Similarly, hereinafter, the delay unit 54a and a delay unit 54b (described later) are simply referred to as a "delay unit 54" when no distinction among them is made.

The delay unit 54a delays the tray open signal input from the tray open detector 42 and outputs the delayed signal to the switch 51, and may be constructed using a delay element (e.g., a capacitor), for example.

The switch 51 enables or disables the Vcc_Dual power supply to be supplied to the optical disk apparatus 4 and the indicator 7, and includes an OR circuit 52a and a switch 53, as illustrated in FIG. 2.

The input of the OR circuit 52a is connected to lines conveying the medium detection signal, the tray open signal, and the delayed tray open signal from the delay unit 54a. The output of the OR circuit 52a is connected to the switch 53. The OR circuit 52a outputs a switch signal to turn on the switch 53 from the output of the OR circuit 52a while at least one of the medium detection signal, the tray open signal, and the delayed tray open signal from the delay unit 54 is being input to the input of the OR circuit 52a. Note that the function as the switch 53 may be embodied using any suitable elements (e.g., a transistor), for example.

The input of the OR circuit 55 is connected to power lines from the Vcc power supply and the Vcc_Dual power supply. The output of the OR circuit 55 is connected to a power line for supplying the power supply voltage Vcc or Vcc_standby to the optical disk apparatus 4 and the indicator 7.

The OR circuit 55 outputs the power supply voltage Vcc to the optical disk apparatus 4 and the indicator 7, in response to the power supply voltage Vcc being input from the Vcc power supply on the input side. Furthermore, the OR circuit 55, when the Vcc_Dual power supply on the input of the OR circuit 55 is enabled by the switch 51 (when the switch 53 is turned on), outputs Vcc_standby received from the Vcc_Dual power supply on the input side, to the optical disk apparatus 4 and the indicator 7, in response to the supply of the power supply voltage Vcc from the Vcc power supply on the input being changed from enable to disabled (in response to the information processing apparatus 1 is powered from on to off).

In other words, the power supply controller 5 supplies the power supply voltage Vcc (or the Vcc_Dual power supply) supplied from the Vcc power supply to the optical disk apparatus 4 and the indicator 7, when the information processing apparatus 1 is powered on.

The power supply controller 5A supplies the power supply voltage Vcc_standby to the optical disk apparatus 4A and the indicator 7, as long as one of the medium detection signal, the tray open signal, and the delayed tray open signal from the delay unit 54a is being input after the information processing apparatus 1 is powered off. More specifically, while at least one of the medium detection signal, the tray open signal, and the delayed tray open signal from the delay unit 54a is being input, the power supply controller 5A supplies the power supply voltage Vcc_standby to the optical disk apparatus 4A and the indicator 7, in response to the information processing apparatus 1 being switched from on to off, as long as at least one of the three signals is being input.

Stated differently, the medium detector 41, the tray open detector 42, the switch 51, the delay unit 54a, and the OR circuit 55 function as a self-holding circuit which continues to supply a power supply voltage (i.e., Vcc when the information processing apparatus 1 is powered on, or Vcc_standby when the information processing apparatus 1 is powered off) to the optical disk apparatus 4A and the indicator 7 until an optical disk is removed, when the optical disk is loaded to the optical disk apparatus 4A while the information processing apparatus 1 is powered on.

In accordance with the optical disk apparatus 4A and the power supply controller 5A configured as described above, even after the information processing apparatus 1 is switched off while an optical disk is in the optical disk apparatus 4A, the power supply voltage Vcc_standby is supplied to the optical disk apparatus 4A as long as an optical disk is in the optical disk apparatus 4A. Accordingly, the user can open and close the medium tray 43 by pressing the eject button 44, to easily check whether an optical disk is in the optical disk apparatus 4A, even after the information processing apparatus 1 is switched off.

The indicator 7 is a light emitting element, e.g., a light emitting diode (LED), for example, and is controlled to be lit on or blinked, indicating that an optical disk is in the optical disk apparatus 4. Stated differently, the indicator 7 is provided for preventing an optical disk from being left. Hereinafter, the indicator 7 is described as an LED.

Note that the indicator 7 may be a display, such as a liquid crystal display (LCD) indicating that an optical disk is inside, by means of texts and/or an audio, or may be a acoustic device (e.g., a buzzer). Alternatively, the indicator 7 may be a transmitter that notifies (sends signals to) a host apparatus connected to the information processing apparatus 1 that an optical disk is inside, through a wire or wirelessly. In this manner, the indicator 7 functions as a notifier that notifies the user that an optical disk is in the optical disk apparatus 4.

The indicator 7 makes an indication that an optical disk is inside, using the power supply voltage Vcc supplied from the power supply controller 5, when the information processing apparatus 1 is powered on while the medium detector 41 is outputting the medium detection signal. The indicator 7, on the other hand, makes an indication that an optical disk is inside, using the power supply voltage Vcc_standby supplied, after the information processing apparatus 1 is switched off while the medium detector 41 is outputting the medium detection signal.

The indicator 7 may be provided anywhere in the information processing apparatus 1. For example, the indicator 7 may be provided on a part of the casing (front panel) of the information processing apparatus 1, as depicted in FIG. 3. Alternatively, the indicator 7 may be provided on the front of the optical disk apparatus 4, as depicted in FIG. 4.

The chipset (controller) 3 is connected to the CPU 2 and the optical disk apparatus 4, and controls the optical disk apparatus 4 in response to a request from the CPU 2. An example of the chipset 3 is an IO controller, for example. Alternatively, the CPU 2 may function as the chipset 3, depending on the configuration of the information processing apparatus 1.

The chipset 3 also controls the indicator 7, in response to the medium detection signal being input to the medium detector 41.

Specifically, the chipset 3 controls the indicator 7 to make an indication (controls to light on or blink) that an optical disk is inside, while the medium detection signal is being input from the medium detector 41. The chipset 3 stops the light-on or blink of the indicator 7, once an input of the medium detection signal from the medium detector 41 is stopped.

As illustrated in FIG. 2, the chipset 3 includes a general purpose input (GPI) 31 and a general purpose output (GPO) 32.

The GPI 31 receives a signal from the particular component controlled by the chipset 3. In the first embodiment, the GPI 31 receives a medium detection signal from the medium detector 41.

The GPO 32 controls the indicator 7 to light it on or blink it using the power supply voltage (Vcc when the information processing apparatus 1 is powered on, or Vcc_standby when the information processing apparatus 1 is powered off) supplied from the power supply controller 5 to the indicator 7, while a medium detection signal is being input to the GPI 31.

For example, the GPI 31 may turn on a register (not illustrated) in response to the medium detection signal being input from the medium detector 41, and may turn off the register in response to the input of the medium detection signal being stopped. The GPO 32 may control the indicator 7 to light it on or blink it, based on the value of that register.

Since the chipset 3 is connected to the Vcc_Dual power supply from the power supply unit 6, the chipset 3 can continue its operation using the power supply voltage Vcc_standby from the Vcc_Dual power supply, even after the information processing apparatus 1 is powered off.

In accordance with the indicator 7 and the chipset 3 configured as described above, even after the information processing apparatus 1 is switched off while an optical disk is in the optical disk apparatus 4, the indicator 7 is continued to be lit on or blinked using the power supply voltage Vcc_standby, as long as the optical disk is in the optical disk apparatus 4 and the medium detection signal from the medium detector 41 is being output. Accordingly, the user can easily check whether an optical disk is in the optical disk apparatus 4 by checking whether the indicator 7 is lit or blinked, even after the information processing apparatus 1 is switched off.

Next, the signal sequence of the medium detection signal, the tray open signal, and the power supply voltage Vcc_standby supplied to the optical disk apparatus 4A in the information processing apparatus 1 configured as described above will be described.

Figure 5A:
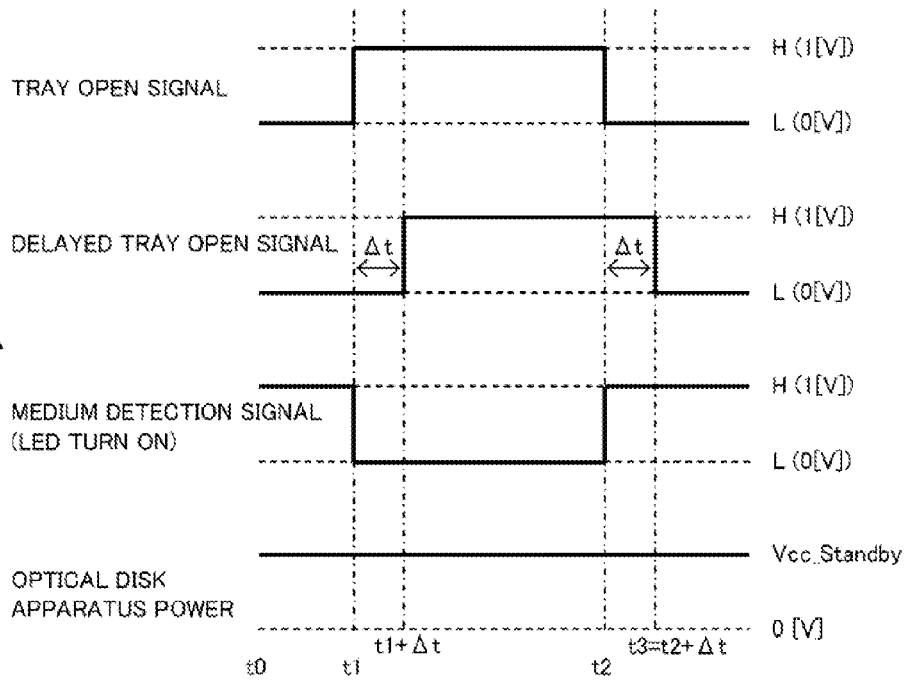
FIGS. 5A and 5B are diagrams illustrating exemplary power supply voltages supplied to an optical disk apparatus and an indicator when the information processing apparatus is switched off according to the first embodiment.
Figure 5B:
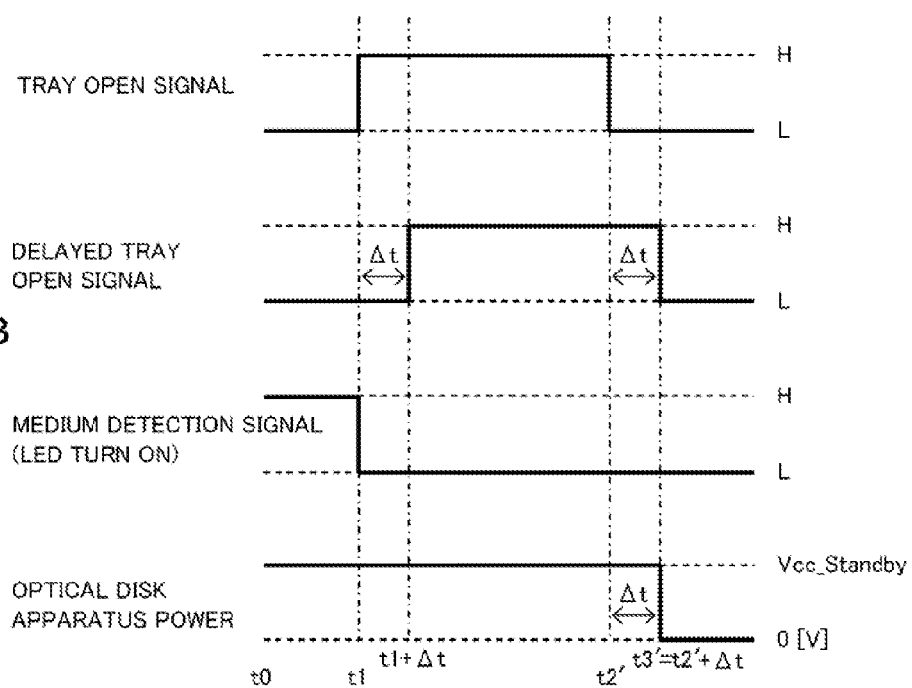

FIGS. 5A and 5B are diagrams illustrating exemplary sequences of the power supply voltage Vcc_standby supplied to the optical disk apparatus 4A and the indicator 7 when the information processing apparatus 1 is switched on to off while an optical disk is in the optical disk apparatus 4A according to the first embodiment.

Here, FIG. 5A illustrates the optical disk apparatus 4A which has been supplied with the power supply voltage Vcc_standby, where a user opens the medium tray 43 by pressing the eject button 44, but closes the medium tray 43 by pressing the eject button 44 again, without removing the optical disk. FIG. 5B illustrates the optical disk apparatus 4A which has been supplied with the power supply voltage Vcc_standby, where a user opens the medium tray 43 by pressing the eject button 44, and closes the medium tray 43 by pressing the eject button 44 again, after removing the optical disk.

FIG. 5A will be described first.

At Time t0, the information processing apparatus 1 is switched on to off while an optical disk is in the optical disk apparatus 4A.

At Time t0, since an optical disk is in the medium tray 43 and the medium tray 43 is closed, the tray open signal is Low ("L", e.g., 0 V) while the medium detection signal is High ("H", e.g., 1 V). Accordingly, the High medium detection signal enables the switch 53, and hence the power supply voltage Vcc_standby is supplied to the optical disk apparatus 4A by the power supply controller 5A. Additionally, since the medium detection signal is High, the indicator 7 is lit on or blinked.

At Time t1, the medium tray 43 is opened in response to the eject button 44 being pressed by the user, and the tray open signal turns High (e.g., 1 V). Since the medium tray 43 is opened and the optical disk is no more detected by the medium detector 41, the medium detection signal turns Low (e.g., 0 V). Accordingly, the High tray open signal keeps the switch 53 enabled, and thus the power supply voltage Vcc_standby is supplied to the optical disk apparatus 4A by the power supply controller 5A. Additionally, since the medium detection signal is Low, the indicator 7 is lit off.

The user presses the eject button 44 without removing the optical disk from the medium tray 43 that is opened. At Time t2, once the medium tray 43 is closed, the medium detector 41 detects the optical disk once again and the medium detection signal turns High. The tray open detector 52 stops the tray open signal from being output in response to the medium tray 43 being closed, but the delay unit 54a delays the switching of the tray open signal from High to Low by a delay time ($\Delta t$ in this example). Accordingly, at Time t2, the High delayed tray open signal and the High medium detection signal keep the switch 53 enabled, and thus the power supply voltage Vcc_standby is supplied to the optical disk apparatus 4A by the power supply controller 5A. Additionally, at Time t2, since the medium detection signal is High, the indicator 7 is lit on or blinked.

At Time t3 (=t2+$\Delta t$), the delay unit 54a turns the delayed tray open signal to Low, but the medium detection signal remains High since the optical disk is still in the medium tray 43. Accordingly, the High medium detection signal keeps the switch 53 enabled, and thus the power supply voltage Vcc_standby is supplied to the optical disk apparatus 4A by the power supply controller 5A. Additionally, at Time t3, since the medium detection signal is High, the indicator 7 is continued to be lit on or blinked.

Next, FIG. 5B will be described. Here, the sequence until Time t1 is similar to that in FIG. 5A, the description will be given from Time t2'.

The user removes the optical disk from the medium tray 43 that is opened, and presses the eject button 44. At Time t2', when the medium tray 43 is closed, the medium detector 41 does not detect the optical disk and the medium detection signal is kept Low. The tray open detector 52 stops the tray open signal from being output in response to the medium tray 43 being closed at Time t2', but the delay unit 54a delays the switching of the tray open signal from High to Low by a delay time $\Delta t$. Accordingly, at Time t2', the High delayed tray open signal keeps the switch 53 enabled, and thus the power supply voltage Vcc_standby is supplied to the optical disk apparatus 4A by the power supply controller 5A. Additionally, at Time t2', since the medium detection signal is Low, the indicator 7 is kept lit off.

Note that the optical disk apparatus 4A completes accommodation of the medium tray 43 into the optical disk apparatus 4A using the power supply voltage Vcc_standby during the delay time $\Delta t$ after Time t2'.

At Time t3' (=t2'+$\Delta t$), the delay unit 54a turns the delayed tray open signal to Low. Accordingly, the Low tray open signal and the Low medium detection signal turn off the switch 53, and the power supply controller 5A disables the power supply voltage Vcc_standby supplied to the optical disk apparatus 4A. Additionally, at Time t3', since the medium detection signal is Low, the indicator 7 is kept lit off.

(1-2) Operation of First Embodiment

Next, an example of the power supply control on the optical disk apparatus 4A and the indicator 7 in the information processing apparatus 1 according to the first embodiment configured as described above will be described.

Figure 6:
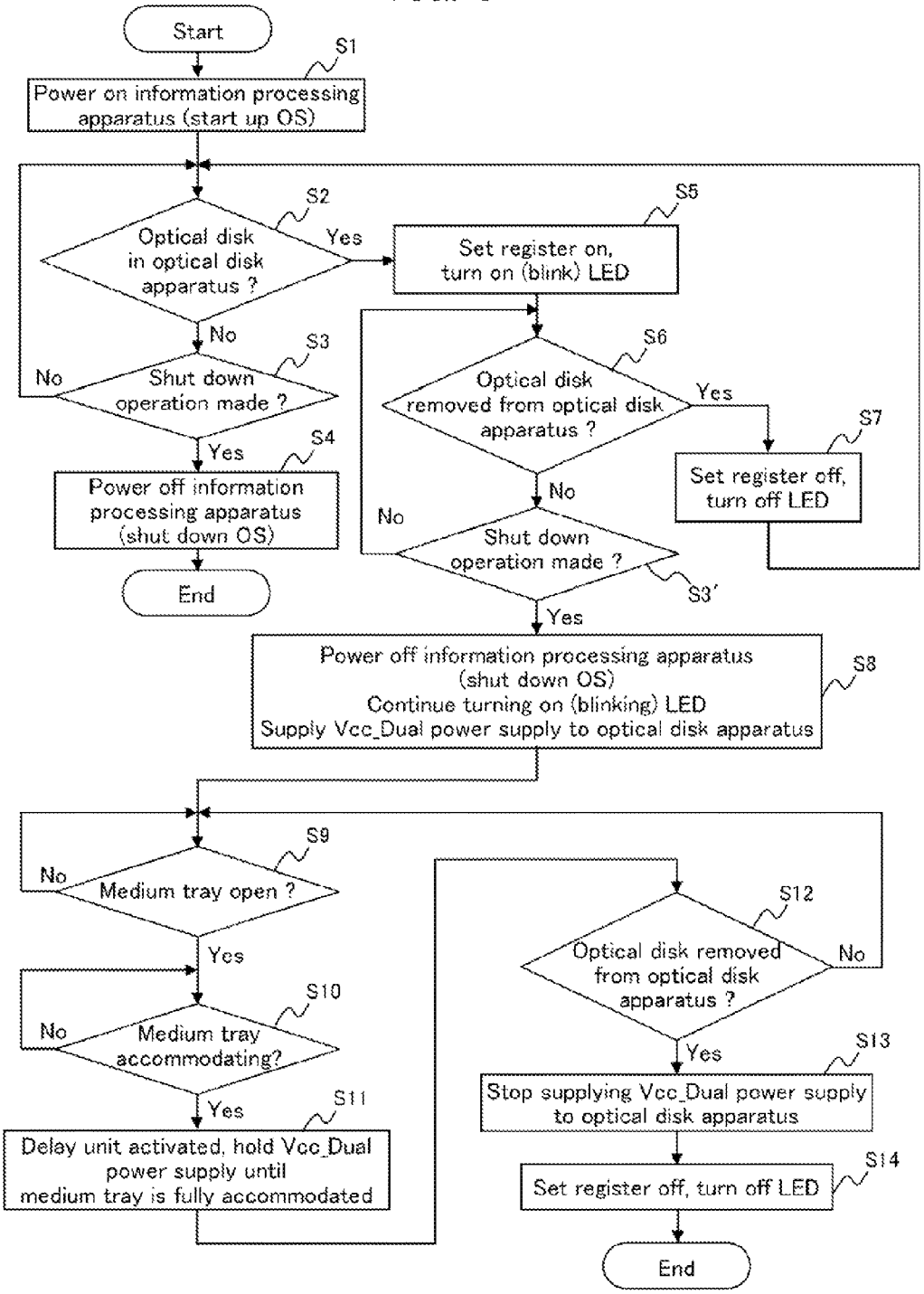
FIG. 6 is a flowchart illustrating an example of the power supply control on the optical disk apparatus and the indicator in the information processing apparatus according to the first embodiment.

FIG. 6 is a flowchart illustrating an example of the power supply control on the optical disk apparatus 4A and the indicator 7 in the information processing apparatus 1 according to the first embodiment.

Firstly, the information processing apparatus 1 is powered on by a user or any other person, and the OS is started up (Step S1).

Subsequently, it is determined by the medium detector 41 whether or not an optical disk is in the optical disk apparatus 4A (Step S2).

If no optical disk is in the optical disk apparatus 4A (the No route from Step S2), it is determined whether or not a shut down operation for the OS has been made by the CPU 2 (Step S3). If a shut down operation for the OS has been made (the Yes route from Step S3), the OS is shut down by the CPU 2 and the information processing apparatus 1 is powered off (Step S4) and the processing is terminated. Otherwise, if a shut down operation for the OS has not been made (the No route from Step S3), the flow moves to the processing in Step S2.

If an optical disk is in the optical disk apparatus 4A in Step S2 (the Yes route from Step S2), a register to light on (blink) an LED as the indicator 7 is turned on by the chipset 3 which receives a medium detection signal to light on (blink) the indicator 7 (Step S5).

Next, it is determined by the optical disk apparatus 4A whether or not an optical disk is removed (Step S6). If an optical disk is removed (the Yes route from Step S6), the medium detection signal is disabled and the register is turned off by the chipset 3 to light off the indicator 7 (Step S7). Then, the flow moves to the processing in Step S2.

If an optical disk is not removed (the No route from Step S6), it is determined whether or not a shut down operation for the OS has been made by the CPU 2 (Step S3'). If a shut down operation for the OS has not been made (the No route from Step S3'), the flow moves to the processing in Step S6. Otherwise, if a shut down operation for the OS has been made (the Yes route from Step S3'), the OS is shut down by the CPU 2 and the information processing apparatus 1 is powered off. Additionally, the indicator 7 is kept lit on (blinked) by the controller 3 since the register is on (Step S8). Further, since the medium detection signal is being output, the power supply voltage Vcc_standby is supplied by the power supply controller 5A from the Vcc_Dual power to the optical disk apparatus 4A.

Until the tray open detector 42 detects that the medium tray 43 is opened, the medium detection signal maintains the supply of the power supply voltage Vcc_standby to the optical disk apparatus 4A (Step S9 and the No route from Step S9).

When an open of the medium tray 43 is detected (the Yes route from Step S9), the tray open signal maintains the supply of the power supply voltage Vcc_standby to the optical disk apparatus 4A until the tray open detector 42 detects an accommodation of the medium tray 43 (Step S10 and the No route from Step S10).

When an accommodation of the medium tray 43 is detected (the Yes route from Step S10), the delayed tray open signal from the delay unit 54a is input to the switch 51 and the supply of the power supply voltage Vcc_standby to the optical disk apparatus 4A is maintained until the accommodation of the medium tray 43 is completed (Step S11).

Next, the medium detector 41 determines whether or not the optical disk has been removed from the optical disk apparatus 4A (Step S12). If the optical disk has not been removed from the optical disk apparatus 4A (the No route from Step S12), i.e., the optical disk is detected in the optical disk apparatus 4A, the flow moves to the processing in Step S9.

Otherwise, if the optical disk has been removed from the optical disk apparatus 4A (the Yes route from Step S12), since the medium detection signal and the tray open signal are not input to the switch 51, the power supply controller 5A stops the supply of the power supply voltage Vcc_standby from the Vcc_Dual power supply to the optical disk apparatus 4A (Step S13).

Additionally, since the medium detection signal is not input to the chipset 3 any more, the chipset 3 turns off the register, the indicator 7 is lit off (Step S14), and the processing is terminated.

As described above, in accordance with the information processing apparatus 1 according to the first embodiment, the power supply voltage Vcc_standby from the power supply unit 6 is supplied to the optical disk apparatus 4A by the power supply controller 5A when the information processing apparatus 1 is being shut down while an optical disk is in the optical disk apparatus 4A.

Accordingly, the user can open and close the medium tray 43 by pressing the eject button 44 as long as an optical disk is in the optical disk apparatus 4A, even when the information processing apparatus 1 is being shut down. Accordingly, the user can check whether an optical disk is in the optical disk apparatus 4A more easily than the conventional technique (i) or (ii) described above. Furthermore, even when the information processing apparatus 1 is being shut down, the user can open the medium tray 43 and remove an optical disk as long as the optical disk is in the optical disk apparatus 4A. Hence, the time and efforts to remove the optical disk can be reduced as compared to the conventional technique (i) or (ii).

The power supply controller 5A stops the supply of the power supply voltage Vcc_standby to the optical disk apparatus 4A and the indicator 7 when an optical disk is removed from the optical disk apparatus 4A which has been supplied with the power supply voltage Vcc_standby. Accordingly, when an optical disk is removed from the optical disk apparatus 4A, the supply of the power supply voltage Vcc_standby to the optical disk apparatus 4A is stopped. Hence, the power consumption during the shutdown of the information processing apparatus 1 is reduced.

Furthermore, the power supply voltage Vcc or Vcc_standby from the power supply unit 6 as the Vcc power supply or the Vcc_Dual power supply is supplied to the optical disk apparatus 4 by the power supply controller 5. Accordingly, even when the information processing apparatus 1 is being shut down, the optical disk apparatus 4 receives the power supply voltage from the same power supply unit 6 that is used when the information processing apparatus 1 is operating. Hence, the manufacturing cost can be reduced and the size of information processing apparatus 1 is kept small since no additional power supply is required.

Additionally, the indicator 7 is lit on or blinked using the power supply voltage Vcc_standby as long as the medium detection signal from the medium detector 41 is being output, even when the information processing apparatus 1 is being shut down while an optical disk is in the optical disk apparatus 4A. Accordingly, even when the information processing apparatus 1 is being shut down, the user can check whether an optical disk is in the optical disk apparatus 4A by checking whether the indicator 7 is lit or blinked, more easily than the conventional technique (i) or (ii) described above.

Furthermore, even when the information processing apparatus 1 is being shut down, the power supply voltage Vcc_standby is supplied to the optical disk apparatus 4A while at least one of the medium detection signal, the tray open signal, and the delayed tray open signal from the delay unit 54a is being input. Accordingly, since the medium detection signal and the tray open signal can be detected by using any techniques known in the art of the optical disk apparatus 4A, the manufacturing cost can be reduced.

Additionally, since the delay unit 54a adjusts the timing until the supply of the power supply voltage Vcc_standby is stopped, it is ensured that the medium tray 43 can be completely accommodated in the optical disk apparatus 4A after an optical disk is removed and the medium tray 43 is closed.

Furthermore, only the power supply controller 5 and the indicator 7 are modified in the above-described information processing apparatus 1, and any known optical disk apparatuses 4 and chipsets 3 can be used. Hence, the manufacturing cost can be reduced.

(1-3) Modification to First Embodiment

Although the information processing apparatus 1 according to the first embodiment has been described wherein the optical disk apparatus 4 is an optical disk apparatus 4A including the medium tray 43, this is not limiting.

Figure 7:
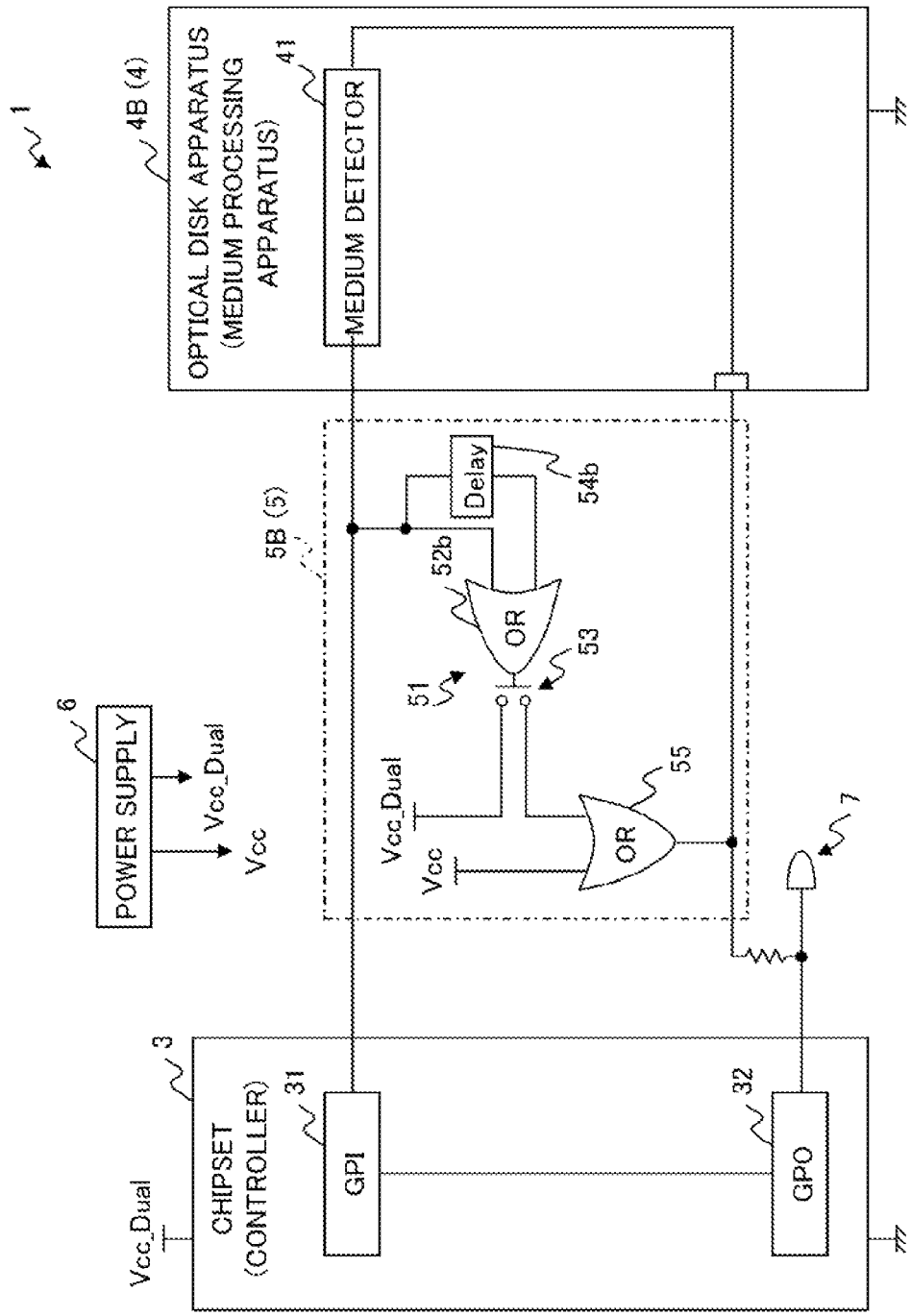
FIG. 7 is a block diagram illustrating a detailed configuration of the information processing apparatus according to a modification to the first embodiment.
Figure 8:
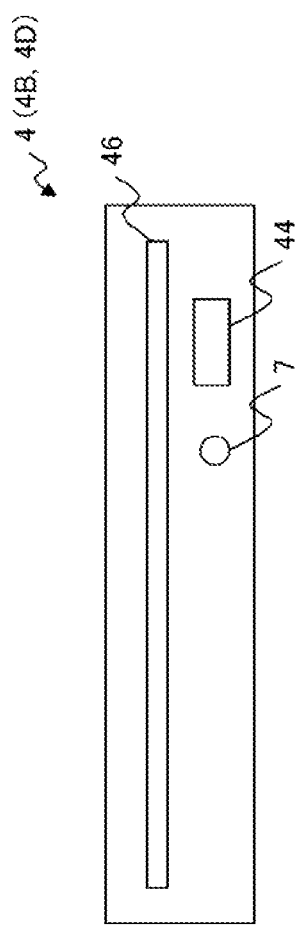
FIG. 8 is a diagram illustrating a structure for loading and unloading an optical disk in an optical disk apparatus according to a modification to the first embodiment.

An information processing apparatus 1 according to a modification to the first embodiment includes an optical disk apparatus 4B employing the slot in mechanism depicted in FIGS. 7 and 8.

FIG. 7 is a block diagram illustrating a detailed configuration of the information processing apparatus 1 according to a modification to the first embodiment, and FIG. 8 is a diagram illustrating a structure for loading and unloading an optical disk in the optical disk apparatus 4B. The elements denoted by the reference symbols in the information processing apparatus 1 depicted in FIGS. 7 and 8 the same as those in the information processing apparatus 1 according to the first embodiment depicted in FIGS. 2 and 4 denote the same or substantially the same elements, and description therefor will be omitted for avoiding any redundancy.

As illustrated in FIG. 8, the optical disk apparatus 4B according to a modification to the first embodiment includes a slot 46, in place of the medium tray 43 and the forced eject hole 45 depicted in FIG. 4.

That is, as illustrated in FIG. 7, the optical disk apparatus 4B includes no tray open detector 42 depicted in FIG. 2, since it includes no medium tray 43.

In place of the delay unit 54a, the power supply controller 5B according to a modification to the first embodiment includes a delay unit 54b that receives the medium detection signal being and delays it. Additionally, lines conveying a medium detection signal and a delayed medium detection signal from the delay unit 54b are connected to the input of the OR circuit 52b.

In other words, the power supply controller 5B supplies the power supply voltage Vcc_standby to the optical disk apparatus 4B and an indicator 7 while the medium detection signal and the delayed medium detection signal from the delay unit 54b when the information processing apparatus 1 is powered off.

More specifically, while at least one of the medium detection signal and the delayed medium detection signal from the delay unit 54b is being input, the power supply controller 5B supplies the power supply voltage Vcc_standby to the optical disk apparatus 4B and the indicator 7 in response to the information processing apparatus 1 being switched from on to off, as long as at least one of the two signals is being input.

Stated differently, the medium detector 41, the switch 51, the delay unit 54b, and the OR circuit 55 function as the above-described self-holding circuit.

In accordance with the optical disk apparatus 4B and the power supply controller 5B configured as described above, the power supply voltage Vcc_standby is supplied to the optical disk apparatus 4B as long as an optical disk is loaded in the optical disk apparatus 4B, even when the information processing apparatus 1 is being shut down while an optical disk is in the optical disk apparatus 4B. Accordingly, the user can remove an optical disk by pressing the eject button 44, to easily check whether an optical disk is in the optical disk apparatus 4B, even when the information processing apparatus 1 is being shut down.

Next, the signal sequence of the medium detection signal, and the power supply voltage Vcc_standby supplied to the optical disk apparatus 4B in the information processing apparatus 1 configured as described above will be described.

Figure 9:
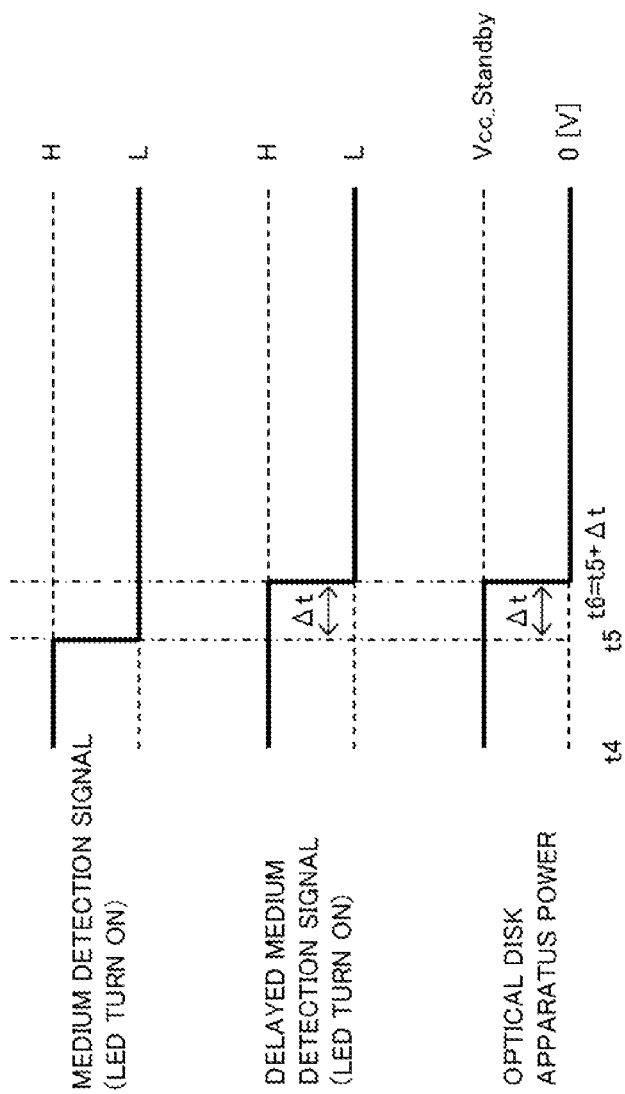
FIG. 9 is a diagram illustrating exemplary power supply voltages supplied to an optical disk apparatus and an indicator when the information processing apparatus is switched off according to a modification to the first embodiment.

FIG. 9 is a diagram illustrating an exemplar sequence of the power supply voltage Vcc_standby supplied to the optical disk apparatus 4B and the indicator 7 when the information processing apparatus 1 is switched on to off while an optical disk is in the optical disk apparatus 4B according to the modification to the first embodiment.

Here, FIG. 9 illustrates the optical disk apparatus 4B which has been supplied with the power supply voltage Vcc_standby, where a user rejects an optical disk from slot 46 by pressing the eject button 44.

At Time t4, the information processing apparatus 1 is switched on to off while an optical disk is in the optical disk apparatus 4B.

At Time t4, since the optical disk is in the slot 46, the medium detection signal is High. Accordingly, the High medium detection signal enables the switch 53, and hence the power supply voltage Vcc_standby is supplied to the optical disk apparatus 4B by the power supply controller 5B. Additionally, since the medium detection signal is High, the indicator 7 is lit on or blinked.

The user presses the eject button 44, and the optical disk is ejected from the slot 46. At Time t5, the optical disk is no more detected by the medium detector 41, and the medium detector 41 stops the medium detection signal from being output. The delay unit 54b, however, delays the switching of the medium detection signal from High to Low by a delay time $\Delta t$. Accordingly, at Time t5, the High delayed medium detection signal keeps the switch 53 enabled, and thus the power supply voltage Vcc_standby is supplied to the optical disk apparatus 4B by the power supply controller 5B. Additionally, at Time t5, since the delayed medium detection signal is High, the indicator 7 is continued to be lit on or blinked.

Note that the optical disk apparatus 4B completes an internal operation on the slot 46 using the power supply voltage Vcc_standby during the delay time $\Delta t$ after Time t5.

At Time 6 ($=t5+\Delta t$), the delay unit 54b turns the delayed medium detection signal to Low. Accordingly, the Low medium detection signal turns off the switch 53, and the power supply voltage Vcc_standby is stopped from being supplied to the optical disk apparatus 4B by the power supply controller 5B. Additionally, at Time t6, since the medium detection signal is Low, the indicator 7 is lit off.

Next, the power supply control on the optical disk apparatus 4B and the indicator 7 in the information processing apparatus 1 according to the modification to the first embodiment configured as described above will be described.

Figure 10:
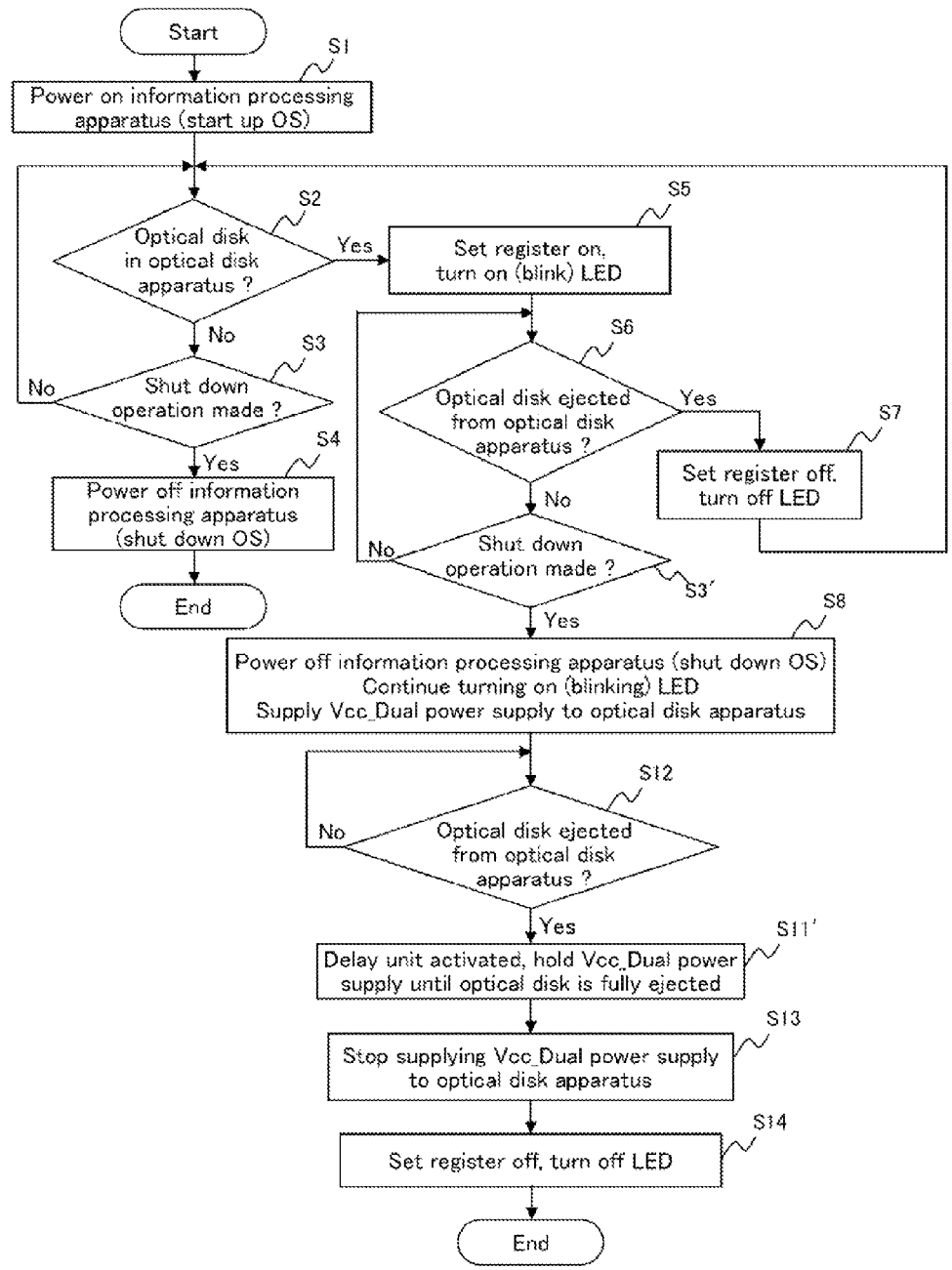
FIG. 10 is a flowchart illustrating an example of the power supply control on the optical disk apparatus and the indicator in the information processing apparatus according to a medication to the first embodiment.

FIG. 10 is a flowchart illustrating an example of the power supply control on the optical disk apparatus 4B and the indicator 7 in the information processing apparatus 1 according to the modification to the first embodiment.

The processing denoted by the reference symbols the same as those depicted in FIG. 6 denote the same or substantially the same processing in the first embodiment, and detailed description therefor will be omitted hereinafter.

In Step S8 in FIG. 10, when the information processing apparatus 1 is switched off while an optical disk is inside, as described above with reference to FIG. 6, the power supply voltage Vcc_standby is supplied from the Vcc_Dual power supply to the optical disk apparatus 4 by the power supply controller 5B.

Until an ejection of optical disk from the optical disk apparatus 4B is detected by the medium detector 41, the medium detection signal maintains the supply of the power supply voltage Vcc_standby to the optical disk apparatus 4B (Step S8 and the No route from Step S12).

When the optical disk is ejected from the optical disk apparatus 4B (the Yes route from Step S12), the delayed medium detection signal from the delay unit 54b is input to the switch 51, and the supply of the power supply voltage Vcc_standby to the optical disk apparatus 4B is maintained until any processing on the slot 46 related to the ejection of the optical disk is completed (Step S11').

Once the input of the medium detection signal to the switch 51 is stopped, the supply of the power supply voltage Vcc_standby from the Vcc_Dual power supply to the optical disk apparatus 4B is stopped by the power supply controller 5 (Step S13).

Additionally, since the medium detection signal is not input to the chipset 3 any more, the chipset 3 turn off the register, the indicator 7 is lit off (Step S14) and the processing is terminated.

As described above, the information processing apparatus 1 according to the modification to the first embodiment can provide the advantages similar to those of the above-described first embodiment.

Additionally, the user can eject an optical disk from the slot 46, by pressing the eject button 44 if an optical disk is in the optical disk apparatus 4B, even when the information processing apparatus 1 is being shut down. Accordingly, the user can check whether an optical disk is in the optical disk apparatus 4B, more easily than the conventional technique (i) or (ii) described above, and the time and efforts to remove the optical disk can be reduced.

Furthermore, even when the information processing apparatus 1 is being shut down, the power supply voltage Vcc_standby is supplied to the optical disk apparatus 4B while at least one of the medium detection signal and the delayed medium detection signal from the delay unit 54b is being input. Accordingly, since the medium detection signal can be detected by using any techniques known in the art of the optical disk apparatus 4B, the manufacturing cost can be reduced.

Additionally, since the delay unit 54b adjusts the timing until the supply of the power supply voltage Vcc_standby is stopped, it is ensured that any internal operation on the slot 46 in the optical disk apparatus 4 can be completely executed after an optical disk is ejected from the slot 46.

(2) Second Embodiment (2-1) Configuration and Operation of Second Embodiment

The information processing apparatus 1 according to the first embodiment and the modification thereto described above has been described that the information processing apparatus 1 includes the power supply controller 5 and the indicator 7 and the optical disk apparatus 4 may be a known optical disk apparatus, but this is not limiting.

Figure 11:
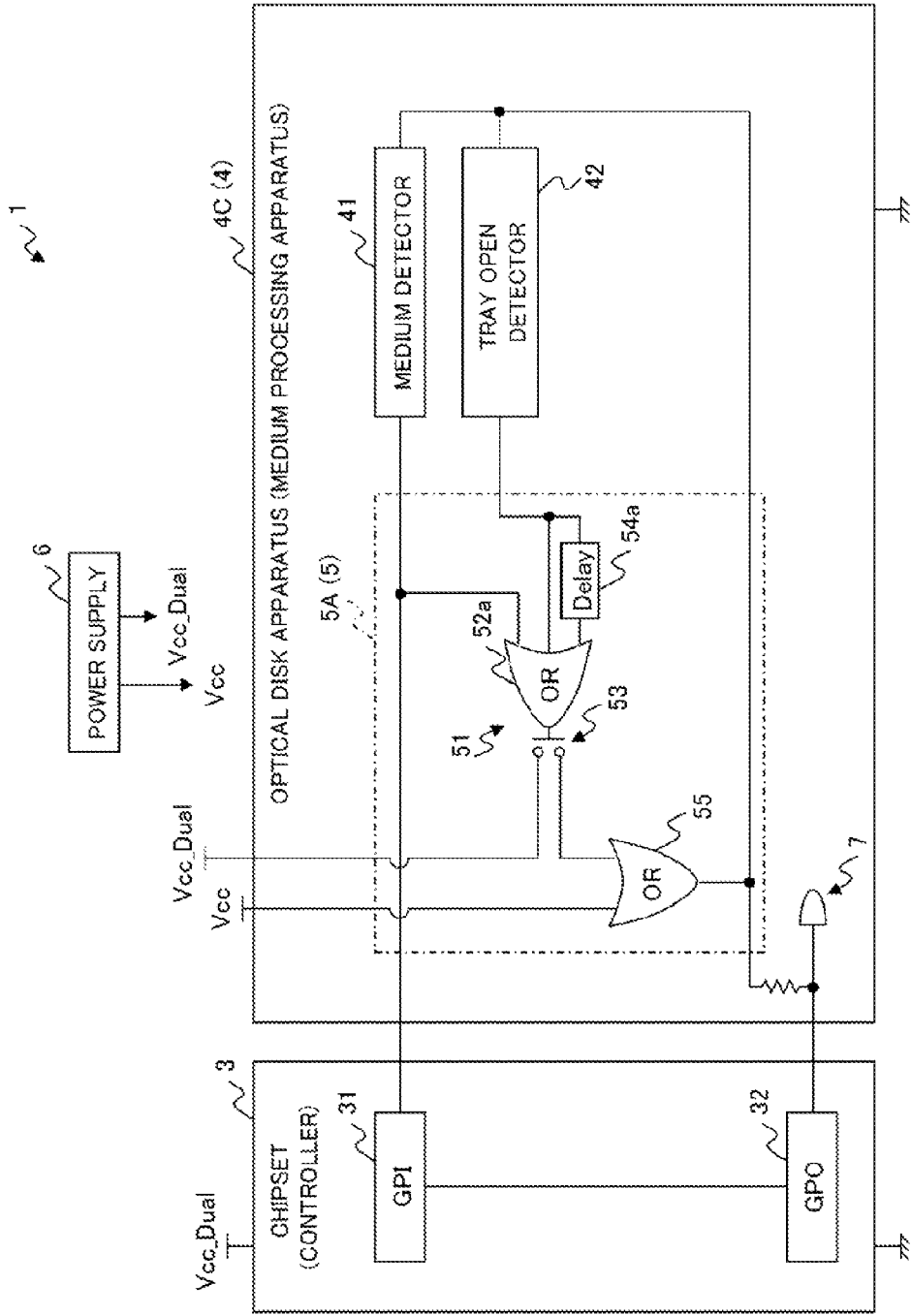
FIG. 11 is a block diagram illustrating a detailed exemplary configuration of the information processing apparatus according to a second embodiment.

An information processing apparatus 1 according to a second embodiment includes an optical disk apparatus 4C, as depicted in FIGS. 11 and 4.

FIG. 11 is a block diagram illustrating a detailed exemplary configuration of the information processing apparatus 1 according to the second embodiment. The elements denoted by the reference symbols in the information processing apparatus 1 depicted in FIG. 11 the same as those in the information processing apparatus 1 according to the first embodiment depicted in FIGS. 2 and 4 denote the same or substantially the same element, and description therefor will be omitted for avoiding any redundancy.

As illustrated in FIG. 11, the optical disk apparatus 4C according to the second embodiment includes a power supply controller 5A and an indicator 7 within the optical disk apparatus 4C, unlike the optical disk apparatus 4A depicted in FIG. 2.

That is, the optical disk apparatus 4C according to the second embodiment includes power lines to which power supply voltages Vcc and Vcc_standby are supplied from a power supply unit 6, a line connected to a GPI 31 and a GPO 32 in a chipset 3, and a line that is connected to the chipset 3 used for controls by a CPU 2 (not illustrated).

Hence, except for the optical disk apparatus 4C and the above-described lines for connecting to the optical disk apparatus 4C, the information processing apparatus 1 according to the second embodiment may be any one of known information processing apparatuses.

Note that the signal sequence of a medium detection signal, a tray open signal, and a power supply voltage Vcc_standby supplied to the optical disk apparatus 4C in the information processing apparatus 1 configured as described above according to the second embodiment is similar to that described above with reference to FIG. 5, and description therefor will be omitted. Additionally, the power supply control on the optical disk apparatus 4C and the indicator 7 in the information processing apparatus 1 is similar to those described above with reference to FIG. 6, and description therefor will be omitted.

As described above, the information processing apparatus 1 according to the second embodiment can provide the advantages similar to those of the above-described first embodiment. Additionally, since the power supply controller 5A and the indicator 7 are provided within the optical disk apparatus 4C, any known information processing apparatuses may be used, as long as it provides the optical disk apparatus 4C according to the second embodiment.

Accordingly, the information processing apparatus 1 according to the second embodiment can reduce the manufacturing and operation costs as compared to the information processing apparatus 1 according to the first embodiment. Further, since the optical disk apparatus 4C can be provided to any of a wide variety of information processing apparatuses, the optical disk apparatus 4C has an improved versatility.

(2-2) Modification to Second Embodiment

Figure 12:
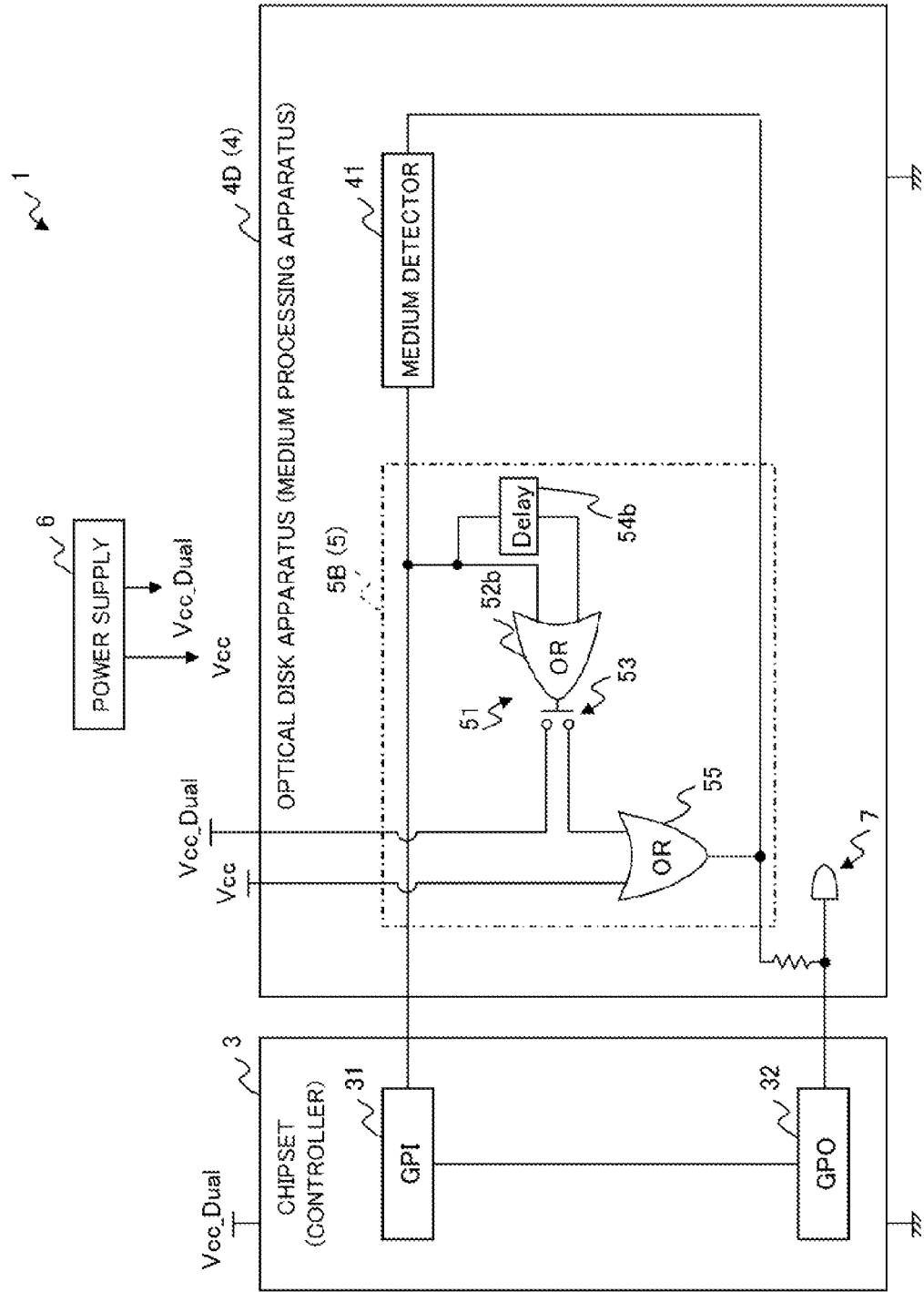
FIG. 12 is a block diagram illustrating a detailed configuration of the information processing apparatus according to a modification to the second embodiment.

As depicted in FIG. 12, the above-described information processing apparatus 1 according to the second embodiment may also include an optical disk apparatus 4D employing the slot in mechanism, like the one in FIGS. 7 and 8.

An information processing apparatus 1 according to a modification to the second embodiment includes an optical disk apparatus 4D, as depicted in FIGS. 12 and 8.

FIG. 12 is a block diagram illustrating a detailed exemplary configuration of the information processing apparatus 1 according to a modification to the second embodiment. The elements denoted by the reference symbols in the information processing apparatus 1 depicted in FIG. 12 the same as those in the information processing apparatus 1 according to the modification to the first embodiment depicted in FIGS. 7 and 8 denote the same or substantially the same element, and description therefor will be omitted for avoiding any redundancy.

As illustrated in FIG. 12, the optical disk apparatus 4D according to the modification to the second embodiment includes a power supply controller 5B and an indicator 7 within the optical disk apparatus 4D, unlike the optical disk apparatus 4B depicted in FIG. 7.

That is, like the optical disk apparatus 4C according to the second embodiment, the optical disk apparatus 4D according to the modification to the second embodiment includes power lines to which power supply voltages Vcc and Vcc_standby are supplied from a power supply unit 6, a line connected to a GPI 31 and a GPO 32 in a chipset 3, and a line that is connected to the chipset 3 used for controls by a CPU 2 (not illustrated).

Hence, except for the optical disk apparatus 4D and the above-described lines for connecting to the optical disk apparatus 4D, the information processing apparatus 1 according to the modification to the second embodiment may be any one of known information processing apparatuses.

Note that the signal sequence of a medium detection signal and a power supply voltage Vcc_standby supplied to the optical disk apparatus 4D in the information processing apparatus 1 configured as described above according to the modification to the second embodiment is similar to that described above with reference to FIG. 9, and description therefor will be omitted. Additionally, the power supply control on the optical disk apparatus 4D and an indicator 7 in the information processing apparatus 1 is similar to that described above with reference to FIG. 10, and description therefor will be omitted.

As described above, the information processing apparatus 1 according to the modification to the second embodiment can provide the advantages similar to those of the above-described modification to the first embodiment. Additionally, since the power supply controller 5B and the indicator 7 are provided within the optical disk apparatus 4D, any known information processing apparatuses may be used, as long as it provide the optical disk apparatus 4D according to the modification to the second embodiment.

Accordingly, the information processing apparatus 1 according to the modification to the second embodiment can reduce the manufacturing and operation costs as compared to the information processing apparatus 1 according to the modification to the first embodiment. Further, since the optical disk apparatus 4D can be provided to any of a wide variety of information processing apparatuses, the optical disk apparatus 4D has an improved versatility.

(3) Miscellaneous

While preferred embodiments of the present disclosure have been described in detailed above, it should be understood that these are exemplary of the invention and are not to be considered as limiting. Any modifications and variations can be made without departing from the sprit of the present disclosure.

For example, while the indicator 7 according to first and second embodiments, and the modifications thereto is lit on/blinked or lit off under the control of the chipset 3 as a controller, in accordance with a medium detection signal, this is not limiting. For example, the optical disk apparatus 4 may function as controller for the indicator 7, and the optical disk apparatus 4 may control the indicator 7 to light it on/blink it or light it off in accordance with the value of a medium detection signal (High or Low) from the medium detector 41. Also in this case, the indicator 7 may be provided anywhere in the information processing apparatus 1 or the optical disk apparatus 4, as depicted in FIGS. 3, 4, and 8.

This can reduce the number of lines connecting the optical disk apparatus 4 and the chipset 3, and the manufacturing cost of the information processing apparatus 1 can be further reduced. Particularly in the information processing apparatus 1 according to the second embodiment and the modification thereto, the optical disk apparatuses 4C and 4D include only power lines to which the power supply voltages Vcc and Vcc_standby are supplied from the power supply unit and a line that is connected to the chipset 3 used for controls by a CPU 2 (not illustrated). Hence, manufacturing cost of the information processing apparatus 1 can be further reduced.

Additionally, the delay unit 54 according to first and second embodiments, and the modifications thereto may be provided to the optical disk apparatus 4, instead of the power supply controller 5.

More specifically, an OR of a medium detection signal, a tray open signal, and a delayed tray open signal from the delay unit 54a may be supplied, from the optical disk apparatus 4A or 4C, to the power supply controller 5A (the OR circuit 52a). Or, an OR of a medium detection signal and a delayed medium detection signal from the delay unit 54b may be supplied, from the optical disk apparatus 4B or 4D, to the power supply controller 5B (the OR circuit 52b).

This can reduce the number of lines connecting the medium detector 41 (and the tray open detector 42) and the power supply controller 5, and the manufacturing cost can be further reduced.

In accordance with the disclosed technique, whether a medium is in a medium processing apparatus can be checked easily.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) has (have) been described in detail, it should be understood that the various changes, substitutions, and alterations could be made hereto without departing from the spirit and scope of the invention.

What is claimed is:

1. An information processing apparatus comprising:
a medium processing apparatus that performs predetermined processing on a medium introduced from an outside;
a power supply that can supply a first power supply voltage to the medium processing apparatus while the information processing apparatus is operating, whereas being able to supply a second power supply voltage to the medium processing apparatus when the information processing apparatus is shut down; and
a power supply controller that supplies the second power supply voltage from the power supply to the medium processing apparatus when the information processing apparatus is shut down while the medium is in the medium processing apparatus, whereas stopping the supply of the second power supply voltage to the medium processing apparatus once the medium is removed from the medium processing apparatus which has been supplied with the second power supply voltage, wherein
the medium processing apparatus comprises a medium detector that outputs a medium detection signal to the power supply controller using the second power supply voltage while a medium is in the medium processing apparatus, as long as the information processing apparatus is shut down while the medium is in the medium processing apparatus, and
the power supply controller supplies the second power supply voltage from the power supply to the medium processing apparatus while the medium detection signal is being input.

2. The information processing apparatus according to claim 1, further comprising
an indicator that generates an indication indicating that the medium is inside while the second power supply voltage from the power supply is being supplied when the information processing apparatus is shut down while the medium detector is outputting the medium detection signal.

3. The information processing apparatus according to claim 2, further comprising
a controller that controls the indicator in response to the medium detection signal being input from the medium detector, the controller making the indicator generate the indication in response to the supply of the second power supply voltage from the power supply when the information processing apparatus is shut down while the medium detection signal is being input.

4. The information processing apparatus according to claim 1, wherein
the medium processing apparatus further comprises:
a medium tray that opens or closes to unload or load the medium from or to the medium processing apparatus; and
a tray open detector that outputs a tray open signal to the power supply controller using the second power supply voltage while the medium tray is open when the information processing apparatus is shut down,
wherein the power supply controller supplies the second power supply voltage from the power supply to the medium processing apparatus while at least one of the medium detection signal and the tray open signal is being input.

5. The information processing apparatus according to claim 4, further comprising
a delay unit that delays the input of the tray open signal,
wherein the power supply controller supplies the second power supply voltage from the power supply to the medium processing apparatus while at least one of the medium detection signal, the tray open signal, and the tray open signal delayed by the delay unit is being input.

6. The information processing apparatus according to claim 1, further comprising
a delay unit that delays the input of the medium detection signal,
wherein the power supply controller supplies the second power supply voltage from the power supply to the medium processing apparatus while at least one of the medium detection signal and the medium detection signal delayed by the delay unit is being input.

7. The information processing apparatus according to claim 1, wherein
the power supply supplies the first power supply voltage or the second power supply voltage to an inside of the information processing apparatus using a power supply voltage supplied from an external power source.

8. The information processing apparatus according to claim 1, wherein
the power supply supplies the second power supply voltage to an inside of the information processing apparatus when an operating system or firmware operated on the information processing apparatus is shut down, determining that the information processing apparatus is shut down.

9. A medium processing apparatus that performs predetermined processing on a medium introduced from an outside, the medium processing apparatus comprising:
a power supply controller,
wherein the medium processing apparatus is provided in an information processing apparatus comprising a power supply that can supply a first power supply voltage to the medium processing apparatus while the information processing apparatus is operating, whereas being able to supply a second power supply voltage to the medium processing apparatus when the information processing apparatus is shut down, and
the power supply controller supplies the second power supply voltage from the power supply to an inside of the medium processing apparatus when the information processing apparatus is shut down while the medium is in the medium processing apparatus, whereas stopping the supply of the second power supply voltage to the inside of the medium processing apparatus once the medium is removed from the medium processing apparatus which has been supplied with the second power supply voltage,
the medium processing apparatus further comprising
a medium detector that outputs a medium detection signal to the power supply controller using the second power supply voltage as long as a medium is in the medium processing apparatus when the information processing apparatus is shut down while the medium is in the medium processing apparatus,
wherein the power supply controller supplies the second power supply voltage from the power supply to the inside of the medium processing apparatus while the medium detection signal is being input.

10. The medium processing apparatus according to claim 9, further comprising
an indicator that generates an indication indicating that the medium is inside while the second power supply voltage from the power supply is being supplied when the information processing apparatus is shut down while the medium detector is outputting the medium detection signal.

11. The medium processing apparatus according to claim 10, further comprising
a controller that controls the indicator in response to the medium detection signal being input from the medium detector,
the controller making the indicator generate the indication in response to the supply of the second power supply voltage from the power supply when the information processing apparatus is shut down while the medium detection signal is being input.

12. The medium processing apparatus according to claim 9, further comprising:
a medium tray that opens or closes to unload or load the medium from or to the medium processing apparatus; and
a tray open detector that outputs a tray open signal to the power supply controller using the second power supply voltage while the medium tray is open when the information processing apparatus is shut down,
wherein the power supply controller supplies the second power supply voltage from the power supply to the inside of the medium processing apparatus while at least one of the medium detection signal and the tray open signal is being input.

13. The medium processing apparatus according to claim 12, further comprising
a delay unit that delays the input of the tray open signal,
wherein the power supply controller supplies the second power supply voltage from the power supply to the medium processing apparatus while at least one of the medium detection signal, the tray open signal, and the tray open signal delayed by the delay unit is being input.

14. The medium processing apparatus according to claim 9, further comprising
a delay unit that delays the input of the medium detection signal,
wherein the power supply controller supplies the second power supply voltage from the power supply to the medium processing apparatus while at least one of the medium detection signal and the medium detection signal delayed by the delay unit is being input.

15. The medium processing apparatus according to claim 9, wherein
the power supply supplies the first power supply voltage or the second power supply voltage to an inside of the medium processing apparatus using a power supply voltage supplied from an external power source.

16. The medium processing apparatus according to claim 9, wherein
the power supply supplies the second power supply voltage to an inside of the medium processing apparatus when an operating system or firmware operated on the information processing apparatus is shut down, determining that the information processing apparatus is shut down.

* * * * *